(12) United States Patent
Saplin

(10) Patent No.: US 11,472,507 B2
(45) Date of Patent: Oct. 18, 2022

(54) BEVERAGE CONTAINER HOLDER WITH DAMPED SUSPENSION

(71) Applicant: Nysus Bikes LLC, Denver, CO (US)

(72) Inventor: Steven Adam Saplin, Denver, CO (US)

(73) Assignee: NYSUS BIKES LLC, Denver, CO (US)

(*) Notice: Subject to any disclaimer, the term of this patent is extended or adjusted under 35 U.S.C. 154(b) by 45 days.

(21) Appl. No.: 17/196,466

(22) Filed: Mar. 9, 2021

(65) Prior Publication Data

US 2021/0284266 A1    Sep. 16, 2021

Related U.S. Application Data

(60) Provisional application No. 62/987,442, filed on Mar. 10, 2020.

(51) Int. Cl.
   *B62J 11/04*    (2020.01)
(52) U.S. Cl.
   CPC ..................... *B62J 11/04* (2020.02)
(58) Field of Classification Search
   CPC ........................................................ B62J 11/04
   USPC .............. D3/202; D7/620; 224/148.1–148.7
   See application file for complete search history.

(56) References Cited

U.S. PATENT DOCUMENTS

| | | | |
|---|---|---|---|
| 4,596,370 A | 6/1986 | Adkins | |
| 6,264,153 B1 | 7/2001 | Ragner et al. | |
| 6,942,131 B2 | 9/2005 | Trautman et al. | |
| D830,785 S * | 10/2018 | Agli | D7/620 |
| D930,351 S * | 9/2021 | Campbell | D3/202 |
| D941,639 S * | 1/2022 | Wang | D7/620 |
| 2010/0051663 A1 | 3/2010 | Carpenter | |
| 2013/0037586 A1 | 2/2013 | Richter et al. | |
| 2016/0088962 A1 * | 3/2016 | Koshman | B62J 11/04 220/592.16 |
| 2017/0349229 A1 | 12/2017 | Drew et al. | |
| 2020/0240622 A1 * | 7/2020 | Austin | F21V 21/0832 |
| 2021/0284266 A1 * | 9/2021 | Saplin | B62J 11/04 |

FOREIGN PATENT DOCUMENTS

KR    20180028349 A * 3/2018

* cited by examiner

*Primary Examiner* — Justin M Larson
(74) *Attorney, Agent, or Firm* — VOZ Patents LLC

(57) ABSTRACT

The present invention relates to a basket type beverage container holder with a suspension system that prevents the ejection of the beverage container from the apparatus. The apparatus provides a clamp for fixation to a bicycle handlebar or other portion of a vehicle. The suspension system of certain embodiments provides damping through the increase of friction upon the beverage container inserted therein.

16 Claims, 4 Drawing Sheets

BEVERAGE CONTAINER HOLDER WITH DAMPED SUSPENSION

CROSS REFERENCE TO RELATED APPLICATIONS

This application claims the benefit of U.S. Provisional Patent Application 62/987,442 entitled "MULTI-DAMPER SUSPENSION CUP HOLDER" filed on Mar. 10, 2020, the entire contents of which are incorporated herein by reference in its entirety for all purposes.

FIELD OF THE INVENTION

The present invention relates to a basket type beverage container holder with a suspension system that prevents the ejection of the beverage container from the apparatus.

BACKGROUND OF THE INVENTION

Amazon® features dozens of bicycle mounted commuter cup holders. Accmor™ models are basic plastic braces that clasp a cup. Other brands use a leather basket and/or circular elastic tightening buckles.

Some existing solutions such as Pub. No. US2013/0037586 to Richter et al. ("Richter"), incorporated herein in its entirety for all purposes, discloses a dual suspension cup holder. Richter discloses a top ring (10) suspended from support brackets (99) on the handlebar by a pair of elastic suspenders (15). An open basket (20) is suspended from the top ring (10) by three elastic suspenders (25). Although the basket provides an aspect to insert a beverage container therein, there are no retaining aspects of the basket which retain the beverage container within the basket. Thus, a bump will cause the stretching of the suspenders downward, and upon the rebound upward of the suspenders toward an unstretched configuration will result in the ejection of the beverage container from the basket.

Certain existing solutions for the holding of a beverage container to prevent the spillage of the beverage container such as U.S. Pat. No. 5,511,754 to Johannsen ("Johannsen") discloses a helical coil spring (16) suspended by a pair of elastic straps (24), each supported by a hook intended for the attachment to a stadium seat. The helical spring (16) has a stop bar (20) to support the base of the beverage container. Thus, in the event that the beverage container held within the apparatus of Johannsen is deflected downward, the elastic straps and the helical spring are stretched, and upon the rebound upward of the elastic straps and the helical spring, toward an unstretched configuration will result in the ejection of the beverage container from the apparatus.

There is a present need for an apparatus for holding a beverage container which comprises a suspension system and damping features to counteract the ejection of the beverage container due to the rebound of the suspension system following the loading, deflection, or stretching of suspension components which act as a spring.

SUMMARY OF THE INVENTION

Certain embodiments of the present invention uses a top support ring which is affixed to bicycle handlebars using a bar clamp. A basket having an open top and constructed of a pliable sheet material is supported by the ring, and within the basket a beverage container can be placed. An adjustable diaphragm of the basket allows the constricting of the basket for cinching the basket around the beverage container to a desired tension. Elastic members extend from the support ring to a bottom aspect of the basket, wherein the elastic members in an unstretched configuration are shorter than the height of the basket, thereby resulting in folds in the basket when the elastic members are in an unstretched configuration which allow the elongation of the elastic members. It will be appreciated that elastic members include, but are not limited to: elastic bands, springs, and other materials or objects known to those skilled in the art with elastic properties allowing them to elongate and return to an unstretched configuration while in keeping with the spirit and scope of the present invention. It will be appreciated that the constricting of the diaphragm about the beverage container increases friction between the basket and the beverage container, assisting in the damping of the rebound action of the elastic members as they go from a stretched configuration toward an unstretched configuration. The folds in the basket allow the stretching of the elastic members without restriction, thus allowing the elastic members to stretch unrestrained to absorb impact forces from impacts withstood by the bicycle. The folds in the basket further provide additional friction between the basket and beverage container which assist in the damping of the rebound action of the elastic members. It will be appreciated that the damping of the rebound action of the elastic members slows the rebound action and mitigates the potential of ejecting the beverage container from the basket as the elastic members rebound.

An aspect of certain embodiments of the present invention is to provide a bicycle (or any vehicle) beverage container holder that has an elastic suspension system coupled with a damping to prevent the ejection of a beverage container from the beverage container holder when hitting a bump.

Another aspect of certain embodiments of the present invention is to provide a first damper being a plastic top spring clamp, a second damper being an adjustable diaphragm, a third damper being use of a moderate friction cloth basket (for example ripstop nylon), and a fourth damper being a pre-stretched plurality of rubber band style elastic members that causes a folding of the basket around the beverage container.

Another aspect of the present invention is to provide a simple handlebar clamp for the beverage container holder.

Other aspects of this invention will appear from the following description and appended claims, reference being made to the accompanying drawings forming a part of this specification wherein like reference characters designate corresponding parts in the several views.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the claims provided herein.

BRIEF DESCRIPTION OF THE DRAWINGS

FIG. 1B—a side perspective view of the beverage container holder in use

DETAILED DESCRIPTION OF VARIOUS EMBODIMENTS

Figure 1A:
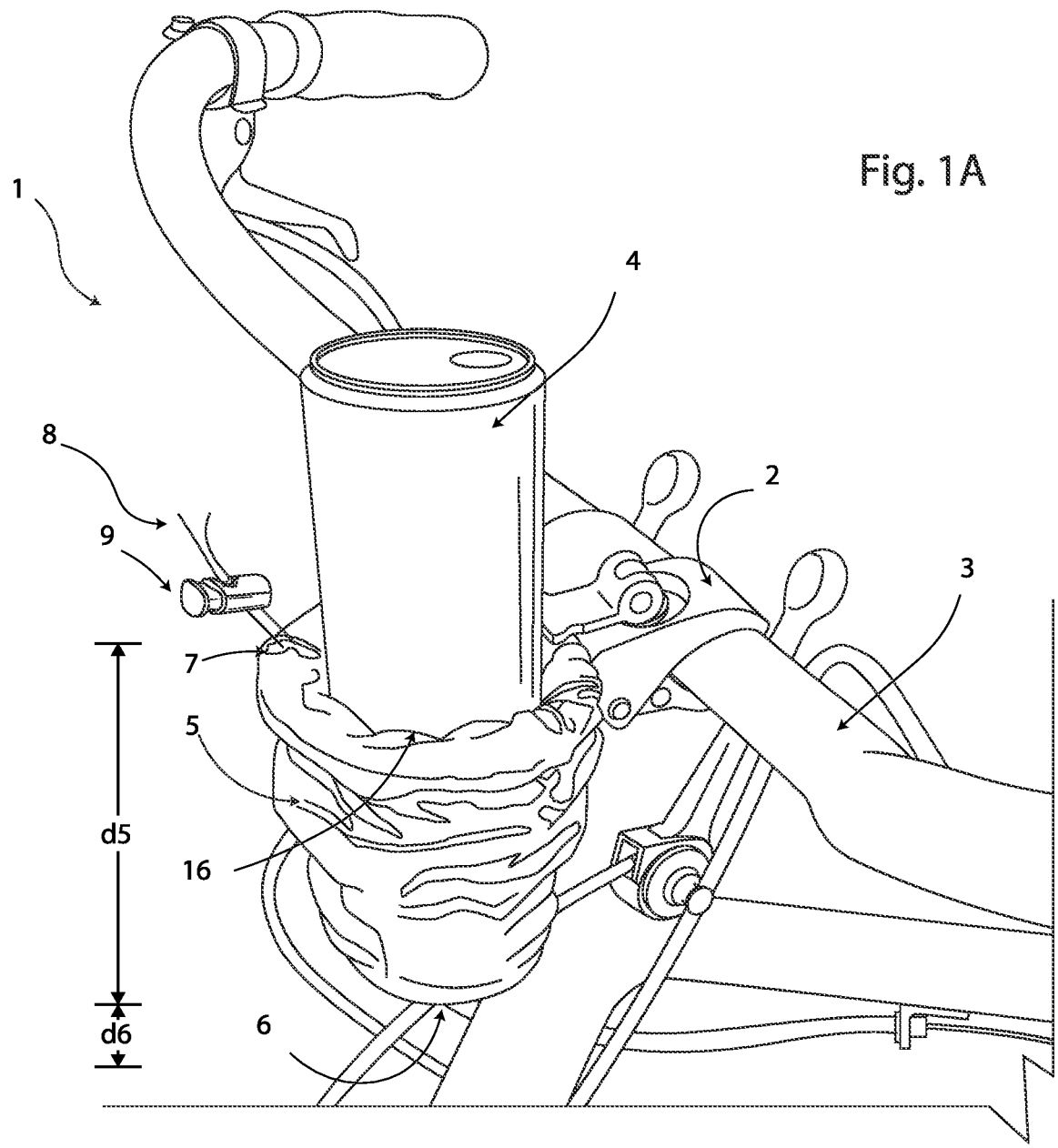
FIG. 1A—a side perspective view of the beverage container holder in use
Figure 1B:
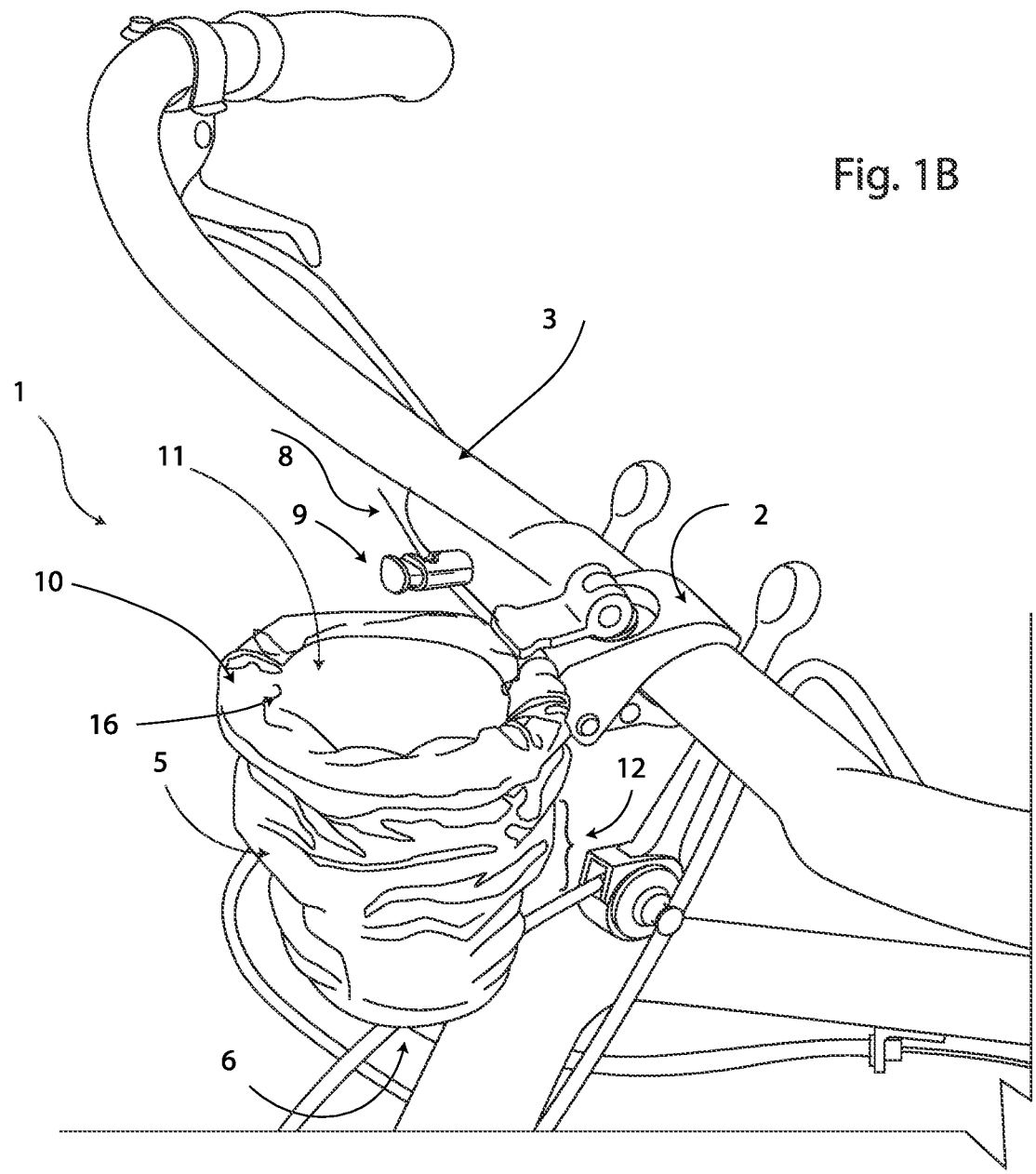
Figure 2:
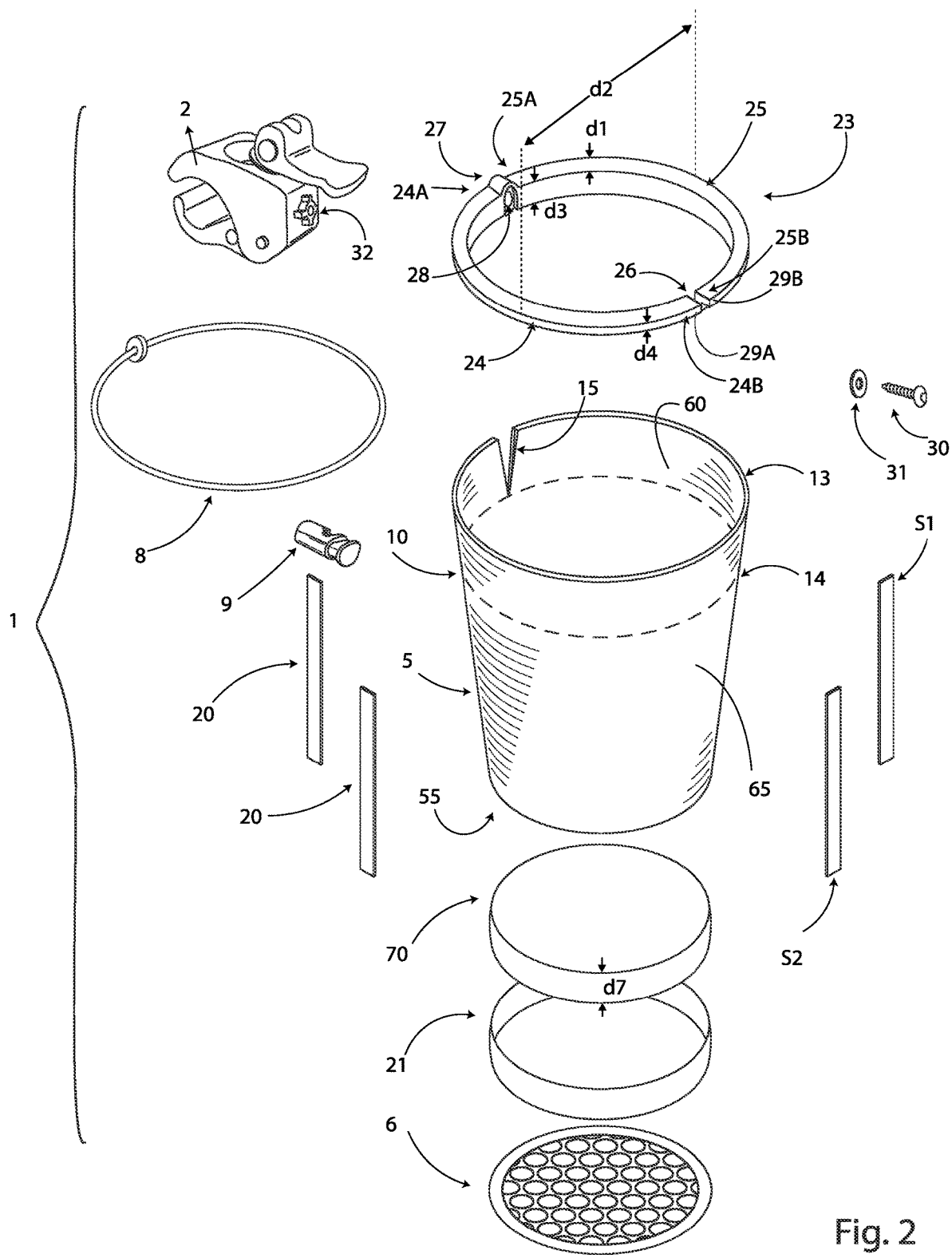
FIG. 2—an exploded view of the beverage container holder

In certain embodiments, referring first to FIG. 1A-FIG. 2, a beverage container holder 1 is secured to the handlebar 3 of a bike with a clamp 2. The beverage container comprises a basket 5 having an open top 11 for the insertion of a beverage container 4 therein. A beverage container 4 as shown inserted into the basket 5 rests upon a bottom 6 of the cloth basket 5. Both before and after insertion of the beverage container 4, the basket 5 has an accordion like fold 12 along its sides indicating that the elastic members have not reached a fully stretched configuration. This is caused by the (four) elastic members 20 being sewn to the basket material while the elastic members are in a stretched configuration. The elastic members 20 are configured to absorb impact to the beverage container 4 held within the basket 5 through elastic deformation of the elastic members 20 downward.

Certain embodiments of the present invention comprise an adjustable diaphragm adjacent to the open top 11 of the basket. In certain embodiments an annular pocket is formed at the top aspect 13 of the basket wherein an inner layer of material 60 is interconnected to an outer layer 65 of material the basket at an offset circumference 14, thereby creating a pocket 10 which extends around the perimeter of the basket. In certain embodiments, a cord 8 is sewn into the pocket 10 wherein the cord 8 moves freely within the pocket 10. Therefore, the tensioning of the cord 8 create a diaphragm 16 to constrict the open top 11 of the basket. which can be adjusted for size and tension in relation to a beverage container inserted therein. The diaphragm 16 is configured to damp the elastic recovery of the elastic members 20 upward, thereby preventing the ejection of the beverage container 4 from the basket 5. In certain embodiments, the cord comprises elastic properties. In certain embodiments, a portion of the cord extends through an aperture 7 for access to the cord 8 for tension adjustment of the cord and thereby the diaphragm 16.

In certain embodiments a notch 15 is cut through the top edge of the basket, allowing the interconnection of the top ring to the clamp 2 for interconnection to a bicycle. In certain embodiments, the notch 15 intersects the pocket 10 thereby allowing the cord 8 to extend therethrough, and allowing the tension adjustment of the diaphragm 16.

In certain embodiments a top ring 23 provides structure to maintain the shape of the open top 11 of the basket. The top ring 23 of certain embodiments comprises an annular shape which a top aspect 13 of the basket is interconnected to. The top ring 23 further comprises a mount 27 for interconnection to a mounting feature such as a clamp 2 for the interconnection to a bicycle.

In certain embodiments, a buckle 9 is used to maintain tension on the cord to maintain a desired diaphragm tension or diameter. In certain embodiments the buckle 9 comprises a device commonly referred to as a "cord lock" as shown in FIG. 1A-FIG. 2, which is configured to receive a drawstring, cord or elastic cord therethrough and is configured to maintain a desired length or tightness of a drawstring, cord or elastic band.

In certain embodiments, the basket 5 comprises a bottom 6 which is interconnected to a bottom aspect 55 the basket. In certain embodiments, the bottom 6 of the basket comprises a perforated material. In certain embodiments a bottom retainer 21 to a bottom aspect 55 of the basket comprises a rigid or semi-rigid ring. The bottom retainer 21 is configured to maintain the bottom aspect 55 of the basket in a desired form, such as a circular form as shown in FIG. 2.

In certain embodiments, a first end S1 the elastic members 20 are interconnected to near the top aspect 13 of the basket. In certain embodiments, a first end S1 of the elastic members 20 are interconnected to the basket at a circumference 14 offset from the top aspect of the basket. In certain embodiments, a second end S2 of the elastic members are interconnected near the bottom aspect 55 of the basket. In certain embodiments the second end S2 of the elastic members are sewn to the basket 5 just above a bottom retainer 21.

The preferred basket 5 material is a breathable, uncalendared 1.9 oz ripstop nylon with durable water repellant. It is finished with a very soft hand for maximum comfort (if in contact with human skin) and increased drape. A range of coefficient of friction is from 0.20 to 0.40 static friction. Typical applications include hammocks, flags, stuff sacks, lining material or lightweight bags. Other materials could include leather, cotton, polyester or canvas. A different embodiment (not shown) is a stocking type nylon basket that clings to the beverage container 4. It will be appreciated that alternate embodiments employing materials not discussed herein, but appreciated by those skilled in the art, are within the spirit and scope of the present invention.

In certain embodiments, the top ring 23 provides damping of the action of the elastic members 20 to prevent ejection of the beverage container 4. The top ring 23 is interconnected to the clamp with a central mount 27 location which is interconnected with a perimeter or circumference of the tip ring 23.

Figure 3:
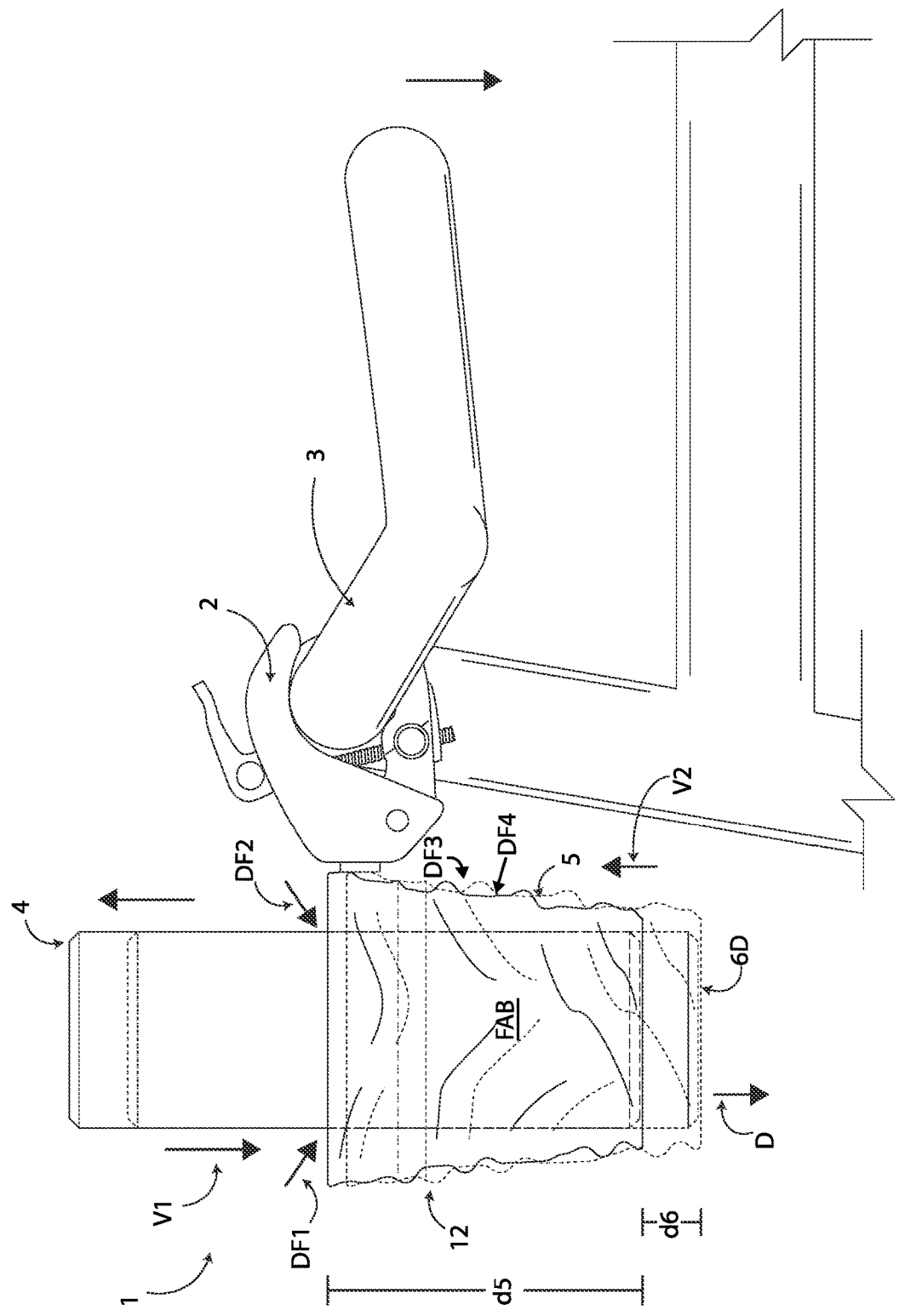
FIG. 3—a side elevation view of the beverage container holder movement during a bump Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

In certain embodiments, the top ring comprises a first arm 24 and a second arm 25. The first ends 24A,25A of the arms are interconnected at a central mount 27, and the second ends 24B,25B of the arms are separated by a gap 26. Arms 24,25 clasp the beverage container 4. Arms 24,25 can be tapered from a thickest portion at the first ends 24A,25A of the arms proximate to the central mount 27 with hole 28 to a thinnest jaw tip 29A,29B at the second ends of the arms 24B,25B. Nominal dimensions of the top ring 23 are: a top width d1=0.3 inch (0.76 cm) proximate to the first end of the arms, a diameter d2=4 inch (10.2 cm), and a first thickness d3=0.56 inch (1.4 cm) proximate to the first end 24A,25A of the arms, and a second thickness d4=0.315 inch (0.80 cm) proximate to the second end 24B,25B of the arms. In certain embodiments, such as shown in FIG. 1A for example, d5=3.5 inch (8.9 cm) with the beverage container 4 inserted as shown. The friction between the top ring and the beverage container provides damping to the action of the elastic members. In certain embodiments, as shown in FIG. 3, after a bump the basket stretches and d6=1 inch (2.5 cm)±0.25 inch (0.64 cm). Alternate embodiments (not shown) eliminate the gap 26.

In certain embodiments, a top ring 23 comprises a first arm 24 and a second arm 25. The arms 24,25 are interconnected at a central mount 27 at a first end 24A,25A of the arms, and are separated by a gap 26 at a second end 24B,25B of the arms. The gap 26 of certain embodiments is used for the ease of manufacture. For instance, a basket 5 is assembled prior to the insertion of the top ring 23 into the pocket 10. The gap 26 allows the insertion of the pocket 10 of the basket over the top ring 23 through the gap 26 and over each of the second ends 24B,25B of the arms of the top ring after the basket 5 has been assembled. In certain embodiments the gap 26 is closed following insertion of the top ring 23 into the pocket 10 by interconnecting the second end of the first arm 24 and the second end of the second arm 25. It will be appreciated that the interconnection of the second ends 24B,25B of the arms can be interconnected through a variety of mechanical manners including but not limited to: adhesive, shrink tubing, sonic welding, welding, and other manners of mechanical interconnection appreciated by those skilled in the art.

In certain embodiments, the diaphragm 16 provides damping to the action of the elastic members 20 by way of increasing friction between the basket 5 and the beverage container 4.

In certain embodiments, the elastic members 20 are heavy duty rubber band material ranging in width from about 0.25 inch (0.64 cm) to about 0.50 inch (1.3 cm). The bottom 6 of certain embodiments comprises a semi-rigid material, while alternate embodiments comprise a bottom 6 of semi-rigid material or wire. The screw 30 threads thru washer 31, hole 28 and interconnects with a mount point 32 of the clamp. In certain embodiments, as shown in FIG. 2, a mount point 32 comprises an aperture. The top ring 23 of certain embodiments is molded using a 30% glass fiber polypropylene so as to provide a spring action of arms 24,25. It will be appreciated that top ring 23 of alternate embodiments can be constructed from alternate materials, including but not limited to: metal, polymers, polymer composite, carbon fiber, and other materials known to those skilled in the art while in keeping with the spirit and scope of the present invention. It will be appreciated that alternate interconnection methods between the top ring and the clamp may be used—including, but not limited to, unibody construction, heat welding, sonic welding, adhesive bonding—while in keeping with the spirit and scope of the present invention.

The elastic members 20 are sewn into the basket 5 in a stretched configuration, allowing the elastic members to contract to a unstretched configuration. Thus, resulting in the creation of folds 12 in the material of the basket 5 as seen FIG. 1A-FIG. 1B, which serves as a damping mechanism due to increased interaction between the basket 5 and the beverage container 4. More fabric engages the beverage container 4 with folds 12 as opposed to a straight sided cloth basket. In certain embodiments it may be desired to manufacture the basket from a high friction material for the basket, as noted above. It will be appreciated that the elastic members of certain embodiments can be replaced It will be appreciated that a beverage container 4 inserted into the basket 5 is able to be inserted into the basket a distance equivalent to the resting distance d5. In certain embodiments, a stand-off 70 is optionally inserted into the basket 5 prior to the insertion of a beverage container 4. The stand-off reduces the distance that a beverage container is inserted into the basket 5 from a distance equal to d5, to a distance equal to d5 minus d7. In certain embodiments d7=1.5 inch (3.8 cm). This is useful in the event that beverage container is shorter than a distance d5 plus d6.

Referring next to FIG. 3 the parts noted in dots simulate the location of the parts as the bicycle hits a bump. Vector V1 shows the force of the beverage container 4 stretching down the elastic members 20. When the bicycle hits a bump, the basket 5 moves generally downward in a direction D in relation to the handlebar 3, wherein the bottom 6 momentarily moves down to position 6D. At that moment the elastic members 20 put an upward force vector V2 on the beverage container 4. Damping forces such as from: DF1 from the top ring 23, DF2 from the buckle 8, DF3 from the folds 12, DF4 from the fabric FAB itself, or any combination thereof prevents the ejection of the beverage container 4 form the basket 5.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents. While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:
1. An apparatus for the holding of a beverage container comprising:
   a clamp;
   a top ring interconnected to the clamp at a mount point, wherein the top ring extends away from the clamp;
   a basket having an open top, and the basket comprising a top aspect interconnected to the top ring, wherein the basket extends away from the open top of the ring;
   the basket further comprising a bottom which is interconnected to a bottom aspect of the basket;
   a first elastic member having a first end interconnected to the basket proximal to the top aspect of the basket, and the first elastic member having a second end interconnected proximal to the bottom aspect of the basket;
   a cord slidably interconnected with the basket, proximal to the top aspect of the basket and at least around a portion of a perimeter of the basket, wherein pulling on the cord constricts the basket inward,
   wherein the first elastic member is configured to absorb impact through elastic deformation downward, and
   wherein the constricted basket is configured to damp the elastic recovery of the first elastic member upward through friction between the constricted basket and a beverage container inserted therein.
2. The apparatus of claim 1, further comprising a bottom interconnected with the basket proximate to the bottom aspect of the basket.

3. The apparatus of claim 2, wherein the basket further comprises a pocket extending around a perimeter of the basket proximate to the top aspect of the basket.

4. The apparatus of claim 3, wherein the cord is inserted through the pocket.

5. The apparatus of claim 4, further comprising a buckle configured to maintain the cord in a desired configuration.

6. The apparatus of claim 5, wherein the buckle comprises a cord lock.

7. The apparatus of claim 6, wherein the cord comprises an elastic cord.

8. The apparatus of claim 4, further comprising a bottom retainer configured to maintain the shape of the bottom aspect of the basket.

9. The apparatus of claim 8 wherein the bottom retainer is configured to maintain the bottom aspect of the basket in a circular form.

10. The apparatus of claim 4, comprising a plurality of elastic members;
    each of the plurality of elastic members comprising a first end interconnected to the basket proximal to the top aspect of the basket;
    and each of the plurality of elastic members comprising a second end interconnected proximal to the bottom aspect of the basket.

11. The apparatus of claim 10, wherein the elastic bands comprise elastic bands.

12. The apparatus of claim 11, further comprising a stand-off having a thickness, wherein the stand-off is configured to be inserted into the bottom aspect of the basket to reduce a distance that a beverage container is inserted into the basket.

13. The apparatus of claim 1, wherein the top ring comprises a first arm with a first end interconnected to the mount point, and a second arm with a first end interconnected to the mount point;
    and the first arm comprising a second end proximate to, a second end of the second arm.

14. The apparatus of claim 13, wherein the second end of the first arm, and the second end of the second arm are separated by a gap.

15. The apparatus of claim 10, wherein the top ring further comprises:
    a first thickness proximate to the first ends of the arms; and
    a second thickness proximate to the second ends of the arms,
    wherein the first thickness is equal to or greater than the second thickness.

16. The apparatus of claim 15, wherein the top ring further comprises a top width,
    wherein the top width is less than the first thickness; and
    the top width is equal to or less than the second thickness.

\* \* \* \* \*